US006940256B2

(12) United States Patent
Sakurai

(10) Patent No.: US 6,940,256 B2
(45) Date of Patent: Sep. 6, 2005

(54) BATTERY STATE MONITORING CIRCUIT AND BATTERY DEVICE

(75) Inventor: Atsushi Sakurai, Chiba (JP)

(73) Assignee: Seiko Instruments Inc., Chiba (JP)

( * ) Notice: Subject to any disclaimer, the term of this patent is extended or adjusted under 35 U.S.C. 154(b) by 161 days.

(21) Appl. No.: 10/670,816

(22) Filed: Sep. 25, 2003

(65) Prior Publication Data

US 2004/0100226 A1 May 27, 2004

(51) Int. Cl.[7] .............................................. H01M 10/46
(52) U.S. Cl. ...................................... 320/134; 320/136
(58) Field of Search ................................ 320/132, 134, 320/136

(56) References Cited

U.S. PATENT DOCUMENTS 5,493,197 A * 2/1996 Eguchi et al. ............. 320/134
6,492,791 B1 * 12/2002 Saeki et al. ................. 320/135
6,642,694 B2 * 11/2003 Yamanaka et al. .......... 320/134
6,885,168 B2 * 4/2005 Okumura et al. ........... 320/135

* cited by examiner

*Primary Examiner*—Edward H. Tso
(74) *Attorney, Agent, or Firm*—Adams & White

(57) ABSTRACT

To realize a battery state monitoring circuit in which detection is reliably made even if a continuous noise is entered, and to provide a battery device which has a long life and is safe. In the battery state monitoring circuit, the detecting circuit outputs a signal for controlling a switch circuit in accordance with a state of the secondary battery with respect to one of a specified voltage value and a specified current value. The signal includes one of: a detection signal for starting one of charge protection and discharge protection of the secondary battery; and a release signal for releasing the one of the charge protection and the discharge protection of the secondary battery. A switching rate from the release signal to the detection signal is higher than a switching rate from the detection signal to the release signal.

8 Claims, 2 Drawing Sheets

BATTERY STATE MONITORING CIRCUIT AND BATTERY DEVICE

BACKGROUND OF THE INVENTION

1. Field of the Invention

The present invention relates to a battery state monitoring circuit capable of controlling a charging/discharging operation of a secondary battery and a battery device using the circuit.

2. Description of the Related Art

A power supply device shown in a circuit block diagram of FIG. 2 has been known as a conventional battery device composed of a secondary battery. That is, a secondary battery 201 is connected with an external terminal −V0 205 or +V0 204 through a switch circuit 203 which is a current limiting unit. Further, a battery state monitoring circuit 202 is connected in parallel with the secondary battery 201. The battery state monitoring circuit 202 has a function for detecting a voltage and a current of the secondary battery 201. In any of: an over-charge state in which the secondary battery 201 has a voltage value higher than a predetermined voltage value; an over-discharge state in which the secondary battery 201 has a voltage value lower than a predetermined voltage value; and an over-current state in which the current flowing in the switch circuit 203 exceeds a predetermined current value with the result that the external terminal −V0 205 reaches a certain voltage, a charge/discharge inhibition signal is outputted from the battery state monitoring circuit 202 such that the switch circuit 203 can be turned off to suspend a charge current or a discharge current. Here, the charge/discharge inhibition signal is outputted by a necessary delay time, thereby preventing a malfunction resulting from a temporal noise (for example, see JP 04-075430 A (FIGS. 1 and 2)).

In the conventional power supply device, the malfunction resulting from the temporal noise can be prevented. However, when a continuous noise enters the device, the above-mentioned states become hard to be detected, thereby shifting a detection voltage.

If the over-charge detection is hard to be effected to shift the detection voltage to a higher voltage, the secondary battery is over-charged, so that a safety margin is reduced. In addition, if the over-discharge detection is hard to be effected to shift the detection voltage to a lower voltage, the secondary battery is over-discharged, so that a battery life is shortened. Further, if the over-current detection is hard to be effected to shift the detection current to a higher current, a large amount of excessive current flows through the switch circuit 203, so that a life of the switch circuit 203 is shortened. Thus, in order to avoid the above-mentioned inconveniences, it is necessary for the conventional power supply device to set the respective detection voltages in a safety margin range.

SUMMARY OF THE INVENTION

Therefore, an object of the present invention is to solve the above-mentioned conventional problems and to realize a battery state monitoring circuit in which detection is reliably made even if a continuous noise is entered, thereby providing a battery device having a long life and safety.

In order to solve the above-mentioned problem, the battery state monitoring circuit of the present invention has a novel structure including an over-charge detecting circuit, an over-discharge detecting circuit, and an over-current detecting circuit, each of which has a detection rate higher than a release rate. Accordingly, when each of the detecting circuits repeats detection and release with a state in which the continuous noise is entered, the detection can be made before an average voltage of the noise reaches a detection voltage.

According to the present invention, there is provided a battery state monitoring circuit, characterized by including:

a switch circuit that adjusts a current of a secondary battery which is chargeable and dischargeable; and a detecting circuit that monitors at least one of a voltage and the current of the secondary battery and outputs a signal for controlling the switch circuit, in which:

the detecting circuit outputs the signal for controlling the switch circuit in accordance with a state of the secondary battery with respect to one of a specified voltage value and a specified current value;

the signal is one of: a detection signal for starting one of charge protection and discharge protection of the secondary battery; and a release signal for releasing the one of the charge protection and the discharge protection of the secondary battery; and a switching rate from the release signal to the detection signal is higher than a switching rate from the detection signal to the release signal.

Further, the battery state monitoring circuit according to the present invention is characterized in that:

the detecting circuit is an over-charge detecting circuit that can detect an upper limit voltage to which the secondary battery is charged; and the over-charge detecting circuit outputs:

the detection signal for the charge protection of the secondary battery by the switch circuit when the voltage of the secondary battery is larger than the upper limit voltage to which the secondary battery is charged; and the release signal for releasing the charge protection of the secondary battery by the switch circuit when the voltage of the secondary battery is equal to or smaller than the upper limit voltage to which the secondary battery is charged.

Further, the battery state monitoring circuit according to the present invention is characterized in that:

the detecting circuit is an over-discharge detecting circuit that can detect a lower limit voltage to which the secondary battery is discharged; and the over-discharge detecting circuit outputs:

the detection signal for the discharge protection of the secondary battery by the switch circuit when the voltage of the secondary battery is equal to or smaller than the lower limit voltage to which the secondary battery is discharged; and the release signal for releasing the discharge protection of the secondary battery by the switch circuit when the voltage of the secondary battery is larger than the lower limit voltage to which the secondary battery is discharged.

Further, the battery state monitoring circuit according to the present invention is characterized in that:

the detecting circuit is an over-current detecting circuit that can detect an upper limit current to which the secondary battery is discharged; and the over-current detecting circuit outputs:

the detection signal for the discharge protection of the secondary battery by the switch circuit when the current of the secondary battery is larger than the upper limit voltage to which the secondary battery is discharged; and the release signal for releasing the discharge protection of the secondary battery by the switch circuit when the current of the secondary battery is equal to or smaller than the upper limit current to which the secondary battery is discharged.

Further, a battery device according to the present invention is characterized by including the battery state monitoring circuit.

DETAILED DESCRIPTION OF THE PREFERRED EMBODIMENT

Figure 1:
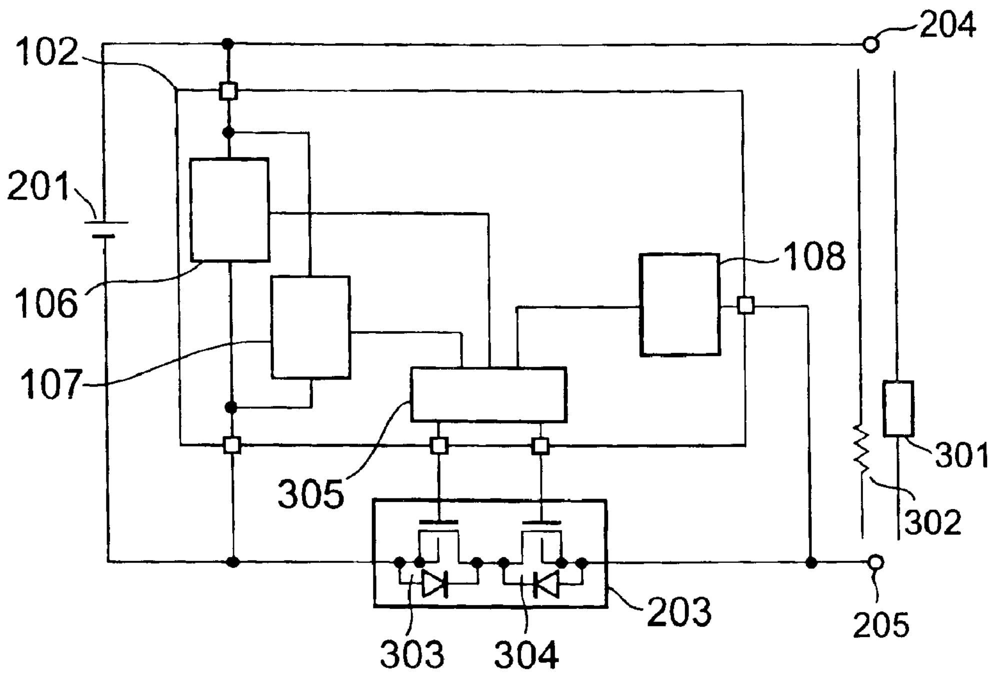
FIG. 1 is a circuit block diagram showing an embodiment of a battery device including a battery state monitoring circuit according to the present invention.
Figure 2:
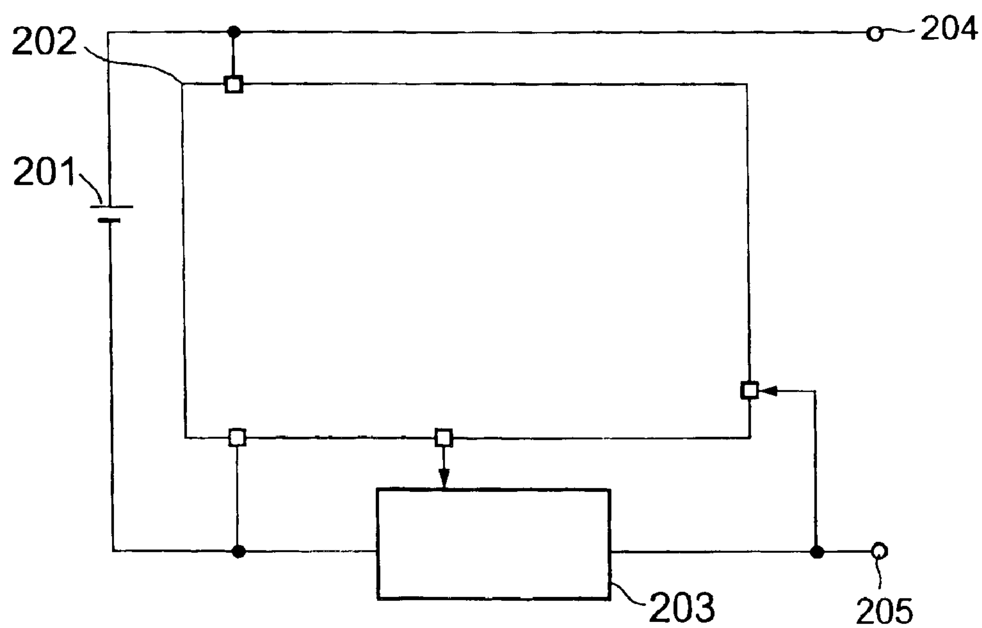
FIG. 2 is a circuit-block diagram showing an example of a conventional battery device including a battery state monitoring circuit.

Hereinafter, an embodiment of the present invention will be described with reference to the drawings. FIG. 1 is a circuit block diagram showing an embodiment of a battery device including a battery state monitoring circuit according to the present invention. As shown in FIG. 1, a battery state monitoring circuit 102 includes an over-charge detecting circuit 106, an over-discharge detecting circuit 107, an over-current detecting circuit 108, and a logic circuit 305.

A charger 301 is connected between an external terminal +V0 204 and an external terminal −V0 205 and a charging operation is started. When a voltage of a secondary battery becomes larger than an upper limit voltage to which the secondary battery is charged, a detection signal is outputted from the over-charge detecting circuit 106. In response to the detection signal, the logic circuit 305 outputs a Lo signal to an FET-B 304 in a switch circuit 203 so as to turn off the FET-B 304. On the other hand, when the voltage of the secondary battery becomes equal to or smaller than the upper limit voltage to which the secondary battery is charged, a release signal is outputted from the over-charge detecting circuit 106. In response to the release signal, the logic circuit 305 outputs a Hi signal to the FET-B 304 in the switch circuit 203 so as to turn on the FET-B 304.

Figure 3:
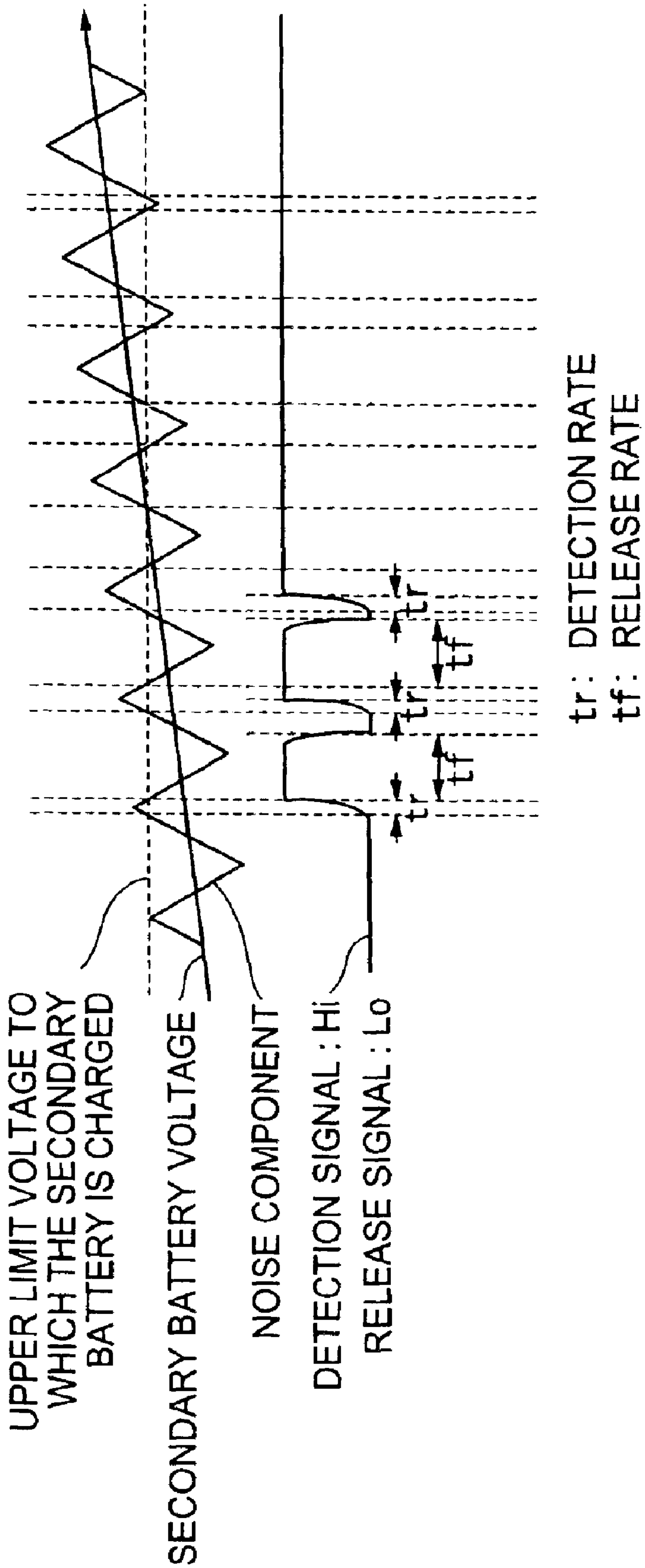
FIG. 3 is a timing chart showing an example of an over-charge detecting operation of the battery state monitoring circuit of the present invention.

FIG. 3 is a timing chart showing an example of an over-charge detecting operation of the battery state monitoring circuit of the present invention. An operation in the case where a continuous noise component is superimposed on a secondary battery voltage will be described with reference to FIG. 3. In the battery state monitoring circuit 102 of the present invention, when the secondary battery voltage on which a continuous noise component is superimposed is increased to approach the upper limit voltage to which the secondary battery is charged, the over-charge detecting circuit 106 alternatively repeats the detection of over-charge and the release of over-charge protection according to the noise component. Because a detection rate tr is higher than a release rate tf in the over-charge detecting circuit 106, the detection is always made before the secondary battery voltage reaches the upper limit voltage to which the secondary battery is charged. Therefore, the conventional problem in which the over-charge detection is hard to be effected to shift shifting a detection voltage to a higher voltage is solved, with the result that a battery device capable of sufficiently ensuring a safety margin can be provided.

Also, in the battery state monitoring circuit 102 of the present invention, a load 302 is connected between the external terminal +V0 204 and the external terminal −V0 205 and a discharging operation is started. When a voltage of the secondary battery becomes equal to or smaller than a lower limit voltage to which the secondary battery is discharged, a detection signal is outputted from the over-discharge detecting circuit 107. In response to the detection signal, the logic circuit 305 outputs a Lo signal to an FET-A 303 in the switch circuit 203 so as to turn off the FET-A 303. On the other hand, when the voltage of the secondary battery becomes larger than the lower limit voltage to which the secondary battery is discharged, a release signal is outputted from the over-discharge detecting circuit 107. In response to the release signal, the logic circuit 305 outputs a Hi signal to the FET-A 303 in the switch circuit 203 so as to turn on the FET-A 303.

Here, for example, the case where a continuous noise component is superimposed on a secondary battery voltage is considered. In the battery state monitoring circuit 102 of the present invention, when the secondary battery voltage on which the noise component is superimposed is reduced to approach the lower limit voltage to which the secondary battery is discharged, the over-discharge detecting circuit 107 alternatively repeats the detection of over-discharge and the release of over-discharge protection according to the noise component. Because a detection rate is higher than a release rate in the over-discharge detecting circuit 107, the detection is always made before the secondary battery voltage reaches the upper limit voltage to which the secondary battery is discharged. Therefore, the conventional problem in which the over-discharge detection is hard to be effected to shift a detection voltage to a lower voltage is solved, with the result that a battery device having a long battery life can be provided.

Also, in the battery state monitoring circuit 102 of the present invention, the load 302 is connected between the external terminal +V0 204 and the external terminal −V0 205 and the discharging operation is started. When a discharge current flowing into the switch circuit 203 is increased and a potential on the external terminal −V0 205 becomes equal to or larger than a predetermined value (that is, the discharge current flowing into the switch circuit 203 becomes equal to or larger than an upper limit value), a detection signal is outputted from the over-current detecting circuit 108. In response to the detection signal, the logic circuit 305 outputs a Lo signal to the FET-A 303 in the switch circuit 203 so as to turn off the FET-A 303. On the other hand, when the discharge current flowing into the switch circuit 203 is decreased and a potential on the external terminal −V0 205 becomes smaller than the predetermined value (that is, the discharge current flowing into the switch circuit 203 becomes smaller than the upper limit value), a release signal is outputted from the over-current detecting circuit 108. In response to the release signal, the logic circuit 305 outputs a Hi signal to the FET-A 303 in the switch circuit 203 so as to turn on the FET-A 303.

Here, for example, the case where a continuous noise component is superimposed on a secondary battery discharge current is considered. In the battery state monitoring circuit 102 of the present invention, when the discharge current on which the noise component is superimposed is increased to approach the upper limit current to which the secondary battery is discharged, the over-current detecting circuit 108 alternatively repeats the detection of over-current and the release of over-current protection according to the noise component. Because a detection rate is higher than a release rate in the over-current detecting circuit 108, the detection is always made before secondary battery discharge current reaches the upper limit current to which to which the secondary battery is discharged. Therefore, the conventional problem in which the over-current detection is hard to be effected to shift a detection current to a higher current is solved, with the result that a battery device having a long switch life can be provided.

Also, when the logic circuit 305 causes the respective detection signals and the respective release signals to be outputted from the over-charge detecting circuit 106, the over-discharge detecting circuit 107, and the over-current detecting circuit 108 by a necessary delay time, a malfunction resulting from a temporal noise can be prevented. In addition, when a necessary hysteresis voltage (or hysteresis current) is set between the detection voltage (or detection current) and a release voltage (or release current) in the over-charge detecting circuit 106, the over-discharge detecting circuit 107, and the over-current detecting circuit 108, respectively, a malfunction upon the detection and the release can be prevented.

The gist of the present invention is to provide, in the battery state monitoring device, the over-charge detecting circuit, the over-discharge detecting circuit, and the over-current detecting circuit, each having the detection rate higher than the release rate. Therefore, if this can be achieved, the present invention is not limited to the above-mentioned embodiment and various other structures can be used. In addition, although the example of the single secondary battery is described, the present invention can be applied to a battery state monitoring circuit that monitors a plurality of secondary batteries. Further, the present invention can be applied to a battery state monitoring circuit that controls a PMOS-FET. Thus, the same effect is obtained regardless of the structure of the battery device.

According to the battery state monitoring circuit and the battery device of the present invention, the over-charge detecting circuit, the over-discharge detecting circuit, and the over-current detecting circuit, each having the detection rate higher than the release rate, are provided in the battery state monitoring circuit. Accordingly, even if the continuous noise is entered, there is an effect that the detection is reliably made.

Thus, there is an effect that the secondary battery is not over-charged, thereby reliably keeping a safety margin. In addition, there is an effect that the secondary battery is not over-discharged, thereby increasing the battery life. Further, there is an effect that a large amount of excessive current does not flow through the switch circuit, thereby increasing the life of the switch circuit. As a result, there is an effect that a battery device which has a long life and is safe can be provided.

What is claimed is:

1. A battery state monitoring circuit, comprising:

a switch circuit that adjusts a current of a secondary battery which is chargeable and dischargeable; and a detecting circuit that monitors at least one of a voltage and the current of the secondary battery and outputs a signal for controlling the switch circuit, wherein:

the detecting circuit outputs the signal for controlling the switch circuit in accordance with a state of the secondary battery with respect to one of a specified voltage value and a specified current value;

the signal is one of: a detection signal for starting one of charge protection and discharge protection of the secondary battery; and a release signal for releasing the one of the charge protection and the discharge protection of the secondary battery; and a switching rate from the release signal to the detection signal is higher than a switching rate from the detection signal to the release signal.

2. A battery state monitoring circuit according to claim 1, wherein:

the detecting circuit is an over-charge detecting circuit that can detect an upper limit voltage to which the secondary battery is charged; and the over-charge detecting circuit outputs:

the detection signal for the charge protection of the secondary battery by the switch circuit when the voltage of the secondary battery is larger than the upper limit voltage to which the secondary battery is charged; and the release signal for releasing the charge protection of the secondary battery by the switch circuit when the voltage of the secondary battery is equal to or smaller than the upper limit voltage to which the secondary battery is charged.

3. A battery state monitoring circuit according to claim 1, wherein:

the detecting circuit is an over-discharge detecting circuit that can detect a lower limit voltage to which the secondary battery is discharged; and the-over-discharge detecting circuit outputs:

the detection signal for the discharge protection of the secondary battery by the switch circuit when the voltage of the secondary battery is equal to or smaller than the lower limit voltage to which the secondary battery is discharged; and the release signal for releasing the discharge protection of the secondary battery by the switch circuit when the voltage of the secondary battery is larger than the lower limit voltage to which the secondary battery is discharged.

4. A battery state monitoring circuit according to claim 1, wherein:

the detecting circuit is an over-current detecting circuit that can detect an upper limit current to which the secondary battery is discharged; and the over-discharge detecting circuit outputs:

the detection signal for the discharge protection of the secondary battery by the switch circuit when the current of the secondary battery is larger than the upper limit current to which the secondary battery is current to which the secondary battery is discharged; and the release signal for releasing the discharge protection of the secondary battery by the switch circuit when the current of the secondary battery is equal to or smaller than the upper limit current to which the secondary battery is charged.

5. A battery device, comprising:

a switch circuit that adjusts a current of a secondary battery which is chargeable and dischargeable; and a detecting circuit that monitors at least one of a voltage and the current of the secondary battery and outputs a signal for controlling the switch circuit, wherein:

the detecting circuit outputs the signal for controlling the switch circuit in accordance with a state of the secondary battery with respect to one of a specified voltage value and a specified current value;

the signal is one of: a detection signal for starting one of charge protection and discharge protection of the secondary battery; and a release signal for releasing the one of the charge protection and the discharge protection of the secondary battery; and a switching rate from the release signal to the detection signal is higher than a switching rate from the detection signal to the release signal.

6. A battery device according to claim 5, wherein:

the detecting circuit is an over-charge detecting circuit that can detect an upper limit voltage to which the secondary battery is charged; and the over-charge detecting circuit outputs:

the detection signal for the charge protection of the secondary battery by the switch circuit when the voltage of the secondary battery is larger than the upper limit voltage to which the secondary battery is charged; and the release signal for releasing the charge protection of the secondary battery by the switch circuit when the voltage of the secondary battery is equal to or smaller than the upper limit voltage to which the secondary battery is charged.

7. A battery device according to claim 5, wherein:

the detecting circuit is an over-discharge detecting circuit that can detect a lower limit voltage to which the secondary battery is discharged; and the over-discharge detecting circuit outputs:

the detection signal for the discharge protection of the secondary battery by the switch circuit when the voltage of the secondary battery is equal to or smaller than the lower limit voltage to which the secondary battery is discharged; and the release signal for releasing the discharge protection of the secondary battery by the switch circuit when the voltage of the secondary battery is larger than the lower limit voltage to which the secondary battery is discharged.

8. A battery device according to claim 5, wherein:

the detecting circuit is an over-current detecting circuit that can detect an upper limit current to which the secondary battery is discharged; and the over-discharge detecting circuit outputs:

the detection signal for the discharge protection of the secondary battery by the switch circuit when the current of the secondary battery is larger than the upper limit current to which the secondary battery is current to which the secondary battery is discharged; and the release signal for releasing the discharge protection of the secondary battery by the switch circuit when the current of the secondary battery is equal to or smaller than the upper limit current to which the secondary battery is charged.

* * * * *